United States Patent
Choi et al.

(10) Patent No.: US 12,460,338 B2
(45) Date of Patent: Nov. 4, 2025

(54) CLOTHING TREATMENT APPARATUS AND METHOD FOR CONTROLLING CLOTHING TREATMENT APPARATUS

(71) Applicant: LG Electronics Inc., Seoul (KR)

(72) Inventors: Byungjae Choi, Seoul (KR); Junyoung Song, Seoul (KR); Taehee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 18/557,816

(22) PCT Filed: Apr. 28, 2022

(86) PCT No.: PCT/KR2022/006068
§ 371 (c)(1),
(2) Date: Oct. 27, 2023

(87) PCT Pub. No.: WO2022/231331
PCT Pub. Date: Nov. 3, 2022

(65) Prior Publication Data
US 2024/0218581 A1 Jul. 4, 2024

(30) Foreign Application Priority Data
Apr. 28, 2021 (KR) .................. 10-2021-0054799

(51) Int. Cl.
*D06F 34/10* (2020.01)
*D06F 34/20* (2020.01)
*D06F 37/40* (2006.01)

(52) U.S. Cl.
CPC .............. *D06F 34/10* (2020.02); *D06F 34/20* (2020.02); *D06F 37/40* (2013.01)

(58) Field of Classification Search
CPC ......... D06F 34/10; D06F 37/304; D06F 37/40
See application file for complete search history.

(56) References Cited

FOREIGN PATENT DOCUMENTS

| JP | 2005-525889 | 9/2005 |
|---|---|---|
| KR | 10-2004-0046216 | 6/2004 |

(Continued)

OTHER PUBLICATIONS

International Search Report and Written Opinion in Appln. No. PCT/KR2022/006068, mailed on Aug. 11, 2022, 24 pages (with English translation).

(Continued)

*Primary Examiner* — Spencer E. Bell
(74) *Attorney, Agent, or Firm* — Fish & Richardson P.C.

(57) ABSTRACT

A clothing treatment apparatus includes: a tub; a rotating tub; a pulsator; a washing shaft connected to the pulsator; a dehydrating shaft connected to the rotating tub; a clutch mechanism transmitting rotating force to the washing shaft and the dehydrating shaft; and a clutch driver operating the clutch mechanism. The clutch driver includes: a clutch motor; a cam interlocking the clutch mechanism; and a clutch motor driver having a control circuit driving the clutch motor. The clutch motor driver includes: a motor driving circuit driving the clutch motor while adjusting a driving direction and a driving speed of the clutch motor; a shunt resistor generating a phase current due to a voltage difference generated by the motor driving circuit; and a motor sensing controller that detects currents of the shunt resistor and determines whether the clutch mechanism and the clutch motor normally operate according to the detected current values.

17 Claims, 8 Drawing Sheets

(56) References Cited

FOREIGN PATENT DOCUMENTS

| KR | 10-2013-0066482 | 6/2013 |
| KR | 10-1790134 | 10/2017 |
| KR | 10-2017-0127756 | 11/2017 |
| KR | 10-1987015 | 6/2019 |
| KR | 10-2229302 | 3/2021 |

OTHER PUBLICATIONS

Office Action in Korean Appln. No. 10-2021-0054799, mailed on Aug. 21, 2022, 12 pages (with English translation).

CLOTHING TREATMENT APPARATUS AND METHOD FOR CONTROLLING CLOTHING TREATMENT APPARATUS

CROSS-REFERENCE TO RELATED APPLICATIONS

This application is a National Stage application under 35 U.S.C. § 371 of International Application No. PCT/KR2022/006068, filed on Apr. 28, 2022, which claims the benefit of Korean Application No. 10-2021-0054799, filed on Apr. 28, 2021. The disclosures of the prior applications are incorporated by reference in their entirety.

TECHNICAL FIELD

The present disclosure relates to a laundry treating apparatus. More specifically, the present disclosure relates to a laundry treating apparatus and a method for controlling the laundry treating apparatus that may sense operation of a clutch for selectively rotating a dehydration tub and a pulsator.

BACKGROUND

In general, a laundry treating apparatus is an apparatus that removes contaminants from contaminated laundry via washing, rinsing, and dehydration processes, and includes a main body that forms an outer appearance thereof, a storage tub installed inside the main body to store water therein, and a rotatable tub that is rotatably installed inside the storage tub.

In such laundry treating apparatus, the laundry and washing water are put together with detergent inside the rotatable tub and the rotatable tub is rotated to wash the laundry by applying a physical impact to the laundry. Additionally, a typical structure operates in two modes: performing the washing by rotating the pulsator at a low speed during the washing; and performing dehydration by simultaneously rotating the pulsator and a dehydration tub at a high speed during the dehydration.

In one example, a general laundry treating apparatus is equipped with a clutch mechanism for selectively transmitting power of the pulsator and the rotatable tub to selectively rotate the pulsator and the rotatable tub, and a clutch driver for operating the clutch mechanism. The clutch mechanism is linked by rotational operation of the clutch driver, allowing the pulsator and the rotatable tub to rotate selectively.

In this regard, the clutch driver and the clutch mechanism according to the prior art are equipped with a switch that senses the rotation of the clutch driver to determine an operating location of the clutch mechanism, and ON/OFF signals of the switch equipped in the clutch driver are sensed to determine an operating state of the clutch mechanism.

However, in the determination on the operation of the clutch mechanism by the switch of the clutch driver according to the prior art, whether the clutch mechanism operates normally is determined using only a contact point of the switch based on the rotation of the clutch driver as power is applied to the clutch driver.

When the operation of the clutch mechanism is determined based on the contact point of the switch of the clutch driver as such, only the normal operation of the clutch mechanism was identified, and it was difficult to smoothly determine an operating state of the clutch motor that operates the clutch driver and the operating state of the clutch mechanism.

Moreover, there was a problem of causing inconvenience to a user as it was impossible to identify whether the clutch mechanism is operated by an operating force generated by the clutch motor and a preset operating force, and whether the clutch mechanism is defective or malfunctions.

SUMMARY

Technical Problem

The present disclosure is designed to solve the above problems, and is to provide a laundry treating apparatus and a method for controlling the laundry treating apparatus that may determine operating states of a clutch mechanism, a clutch driver, and a clutch motor of the laundry treating apparatus without adding a separate sensor.

In addition, the present disclosure is designed to solve the above problems, and is to provide a laundry treating apparatus and a method for controlling the laundry treating apparatus that may determine an operation error of a power supply that drives a clutch motor of a clutch driver by analyzing a current waveform generated by the clutch motor of the clutch driver that operates a clutch mechanism of the laundry treating apparatus.

In addition, the present disclosure is designed to solve the above problems, and is to provide a laundry treating apparatus and a method for controlling the laundry treating apparatus that may determine operation errors of a clutch driver and a clutch motor by analyzing a current waveform generated by the clutch motor of the clutch driver that operates a clutch mechanism of the laundry treating apparatus.

In addition, the present disclosure is designed to solve the above problems, and is to provide a laundry treating apparatus and a method for controlling the laundry treating apparatus that may determine operating locations of a clutch driver and a clutch motor by counting a current waveform generated by the clutch motor of the clutch driver that operates a clutch mechanism of the laundry treating apparatus.

Purposes of the present disclosure are not limited to the purposes mentioned above, and other purposes not mentioned will be clearly understood by those skilled in the art from the description below.

Technical Solutions

A laundry treating apparatus according to one embodiment of the present disclosure for achieving the above purposes includes a water storage tub where washing water is stored, a rotatable tub rotatably disposed in the water storage tub, a pulsator rotatably disposed at a lower portion of the rotatable tub, a washing shaft connected to the pulsator, a dehydrating shaft connected to the rotatable tub, a clutch mechanism that selectively transmits a rotational force to the washing shaft and the dehydrating shaft, and a clutch driver that operates the clutch mechanism. The clutch driver includes a clutch motor having a driving shaft, a cam that links the clutch mechanism based on rotation of the clutch motor, and a clutch motor driver having a control circuit for driving the clutch motor, and the clutch motor driver includes a motor driving circuit that drives the clutch motor by adjusting a driving direction and a driving speed of the clutch motor, a shunt resistor where a phase current is generated by a voltage difference occurring in the motor driving circuit, and a motor sensing controller that detects a current at both ends of the shunt resistor and determines normal operation of the clutch mechanism and the clutch motor based on the current detected value of the shunt resistor.

In this regard, the motor driving circuit may include two switching elements constituting an upper arm, four free wheeling diodes, and two switching elements constituting a lower arm, and the two switching elements constituting the upper arm may be connected to a positive DC bus and the two switching elements constituting the lower arm may be connected to a ground DC bus to respectively convert a pulse width control signal and an inverted pulse width control signal into alternating current signals to drive the clutch motor.

In addition, the shunt resistor may be disposed between the ground DC bus and a node receiving an introduced current from the clutch motor, wherein when the current from the clutch motor flows, a voltage difference may occur between the both ends of the shunt resistor, and the phase current of a waveform with a certain pattern by the voltage difference at the both ends may be generated.

In addition, the motor sensing controller may determine whether a lowest point of the waveform pattern is included in a reference current range based on the waveform pattern of the phase current sensed by the voltage difference between the both ends of the shunt resistor, and determine that a defect has occurred in the motor driving circuit when the lowest point of the waveform pattern is not included in the reference current range.

In addition, the motor sensing controller may determine whether the waveform pattern is formed at a regular spacing based on the waveform pattern of the phase current sensed by the voltage difference between the both ends of the shunt resistor, and determine that a defect has occurred in the clutch motor when the waveform pattern is not repeatedly formed at the regular spacing.

In addition, the motor sensing controller may determine whether peaks of the waveform pattern are formed at a regular spacing based on the waveform pattern of the phase current sensed by the voltage difference between the both ends of the shunt resistor, and determine that a defect has occurred in the clutch driver or the clutch mechanism when the peaks of the waveform pattern are not formed repeatedly at the regular spacing.

In one example, the clutch motor driver may further include a converter that converts AC power supplied from a commercial AC power source into DC power, a reactor disposed between the commercial AC power source and the converter, and a smoothing capacitor that smoothens the power input via the converter and stores the smoothened power.

In this regard, the motor driving circuit may include three pairs connected in series with each other, wherein each pair has an upper arm switching element and a lower arm switching element connected in parallel with each other, and diodes connected to each other in an inverse-parallel manner respectively in each upper arm switching element and each lower arm switching element, and the motor driving circuit may convert the smoothened DC power into three-phase AC power of a predetermined frequency by on/off operations of each switching element to drive the clutch motor.

In addition, the shunt resistor may be disposed between the converter and a node receiving an introduced current from the clutch motor, wherein when the current from the clutch motor flows, a voltage difference may occur between the both ends of the shunt resistor, and the phase current of a waveform with a certain pattern by the voltage difference at the both ends may be generated.

In addition, the motor sensing controller may determine whether a lowest point of the waveform pattern is included in a reference current range based on the waveform pattern of the phase current sensed by the voltage difference between the both ends of the shunt resistor, and determine that a defect has occurred in the motor driving circuit when the lowest point of the waveform pattern is not included in the reference current range.

In addition, the motor sensing controller may determine whether the waveform pattern is formed at a regular spacing based on the waveform pattern of the phase current sensed by the voltage difference between the both ends of the shunt resistor, and determine that a defect has occurred in the clutch motor when the waveform pattern is not repeatedly formed at the regular spacing.

In addition, the motor sensing controller may determine whether peaks of the waveform pattern are formed at a regular spacing based on the waveform pattern of the phase current sensed by the voltage difference between the both ends of the shunt resistor, and determine that a defect has occurred in the clutch driver or the clutch mechanism when the peaks of the waveform pattern are not formed repeatedly at the regular spacing.

In one example, a method for controlling a laundry treating apparatus including a water storage tub where washing water is stored, a rotatable tub rotatably disposed in the water storage tub, a pulsator rotatably disposed at a lower portion of the rotatable tub, a washing shaft connected to the pulsator, a dehydrating shaft connected to the rotatable tub, a clutch mechanism that selectively transmits a rotational force to the washing shaft and the dehydrating shaft, a clutch motor that links the clutch mechanism, and a clutch motor driver having a control circuit to drive the clutch motor, wherein the clutch motor driver includes a motor driving circuit that drives the clutch motor by adjusting a driving direction and a driving speed of the clutch motor, and a shunt resistor where a phase current is generated by a voltage difference occurring in the motor driving circuit according to one embodiment of the present disclosure for achieving the above purposes includes a power supply of applying power to the motor driving circuit to drive the clutch motor, a detection of detecting a waveform of the phase current generated at both ends of the shunt resistor connected in series to an output terminal of the motor driving circuit, and a determination of determining operation of the clutch mechanism and the clutch motor based on a current waveform pattern of the phase current generated in the shunt resistor.

In this regard, the detection may include detecting the waveform of the phase current generated in the shunt resistor, and the determination may include determining that a defect has occurred in a power supply configured to supply the power when the waveform pattern is not detected.

In addition, the detection may include detecting a lowest point of the waveform pattern of the phase current generated in the shunt resistor, and the determination may include determining that a defect has occurred in the motor driving circuit when the lowest point of the detected waveform pattern is not included in a reference current range.

In addition, the detection may include detecting a spacing of the waveform pattern of the phase current generated in the shunt resistor, and the determination may include determining that a defect has occurred in the clutch motor when the detected waveform pattern is not formed repeatedly at a regular spacing.

In addition, the detection may include detecting peaks and a spacing between the peaks of the waveform pattern of the phase current generated in the shunt resistor, and the determination may include determining that a defect has occurred in the clutch driver or the clutch mechanism when the peaks of the waveform pattern are not formed repeatedly at a regular spacing.

Advantageous Effects

According to the laundry treating apparatus and the method for controlling the laundry treating apparatus according to the present disclosure, the operating states of the clutch mechanism, the clutch driver, and the clutch motor of the laundry treating apparatus may be determined without adding the separate sensor.

In addition, according to the laundry treating apparatus and the method for controlling the laundry treating apparatus according to the present disclosure, the operation error of the power supply that drives the clutch motor may be determined by analyzing the current waveform generated by the clutch motor of the clutch driver that operates the clutch mechanism of the laundry treating apparatus.

In addition, according to the laundry treating apparatus and the method for controlling the laundry treating apparatus according to the present disclosure, the operation errors of the clutch driver and the clutch motor may be determined by analyzing the current waveform generated by the clutch motor of the clutch driver that operates the clutch mechanism of the laundry treating apparatus.

In addition, according to the laundry treating apparatus and the method for controlling the laundry treating apparatus according to the present disclosure, the operating locations of the clutch driver and the clutch motor may be determined by counting the current waveform generated by the clutch motor of the clutch driver that operates the clutch mechanism of the laundry treating apparatus.

Effects of the present disclosure are not limited to the effects mentioned above, and other purposes not mentioned will be clearly understood by those skilled in the art from the description below.

DETAILED DESCRIPTION

Hereinafter, with reference to the attached drawings, embodiments of the present disclosure will be described in detail such that those skilled in the art may easily practice the same. The present disclosure may be implemented in a number of different forms and may not be limited to the embodiments described herein.

To clearly describe the present disclosure, a portion unrelated to the description is omitted, and the same reference numerals are assigned to identical or similar components throughout the present document.

When one component is described as being "connected" to another component throughout the present document, this includes not only a case in which the components are "directly connected" to each other, but also a case in which the components are "electrically connected" to each other with another component interposed therebetween. Additionally, when one component "includes" another component, this means that the one component may further include other components rather than excluding other components, unless otherwise stated.

When one component is referred to as being located "on" another component, the one component may be directly on top of said another component or still another component may be interposed therebetween. In contrast, when one component is mentioned to be "directly on" another component, still another component is not interposed therebetween.

Terms such as first, second, and third are used to describe, but are not limited to, various components, constituents, areas, layers, and/or sections. Such terms are used only to distinguish one component, constituent, area, layer, or section from another component, constituent, area, layer, or section. Accordingly, a first component, constituent, area, layer, or section described below may be referred to as a second component, constituent, area, layer, or section without departing from the scope of the present disclosure.

The terminology used herein is only intended to refer to a specific embodiment and is not intended to limit the present disclosure. As used herein, singular forms include plural forms unless phrases clearly indicate the contrary. As used herein, "including" specifies a particular characteristic, area, integer, step, operation, element, and/or constituent, and does not exclude presence or addition of another characteristic, area, integer, step, operation, element, and/or constituent.

Terms indicating relative space, such as "under" and "on" may be used to more easily describe a relationship of one component shown in the drawing to another component. Such terms are intended to include other meanings or operations of a device in use along with the meaning intended in the drawings. For example, when the device in the drawing is turned over, some components described as being "under" other components will be described as being "on" said other components. Accordingly, the exemplary term "under" includes both upward and downward directions. The device may be rotated by 90° or by another angle, and the terms indicating the relative space are interpreted accordingly.

Although not defined differently, all terms used herein, including technical and scientific terms, have the same meaning as those generally understood by those skilled in the art in the technical field to which the present disclosure belongs. Terms defined in commonly used dictionaries are further interpreted as having meanings consistent with related technical literature and currently disclosed content, and are not interpreted in ideal or very formal meanings unless defined.

Hereinafter, with reference to the attached drawings, embodiments of the present disclosure will be described in detail such that those skilled in the art may easily practice the same. However, the present disclosure may be implemented in several different forms and may not be limited to the embodiments described herein.

Hereinafter, a laundry treating apparatus according to one embodiment of the present disclosure will be described in detail with reference to the attached drawings.

Figure 1:
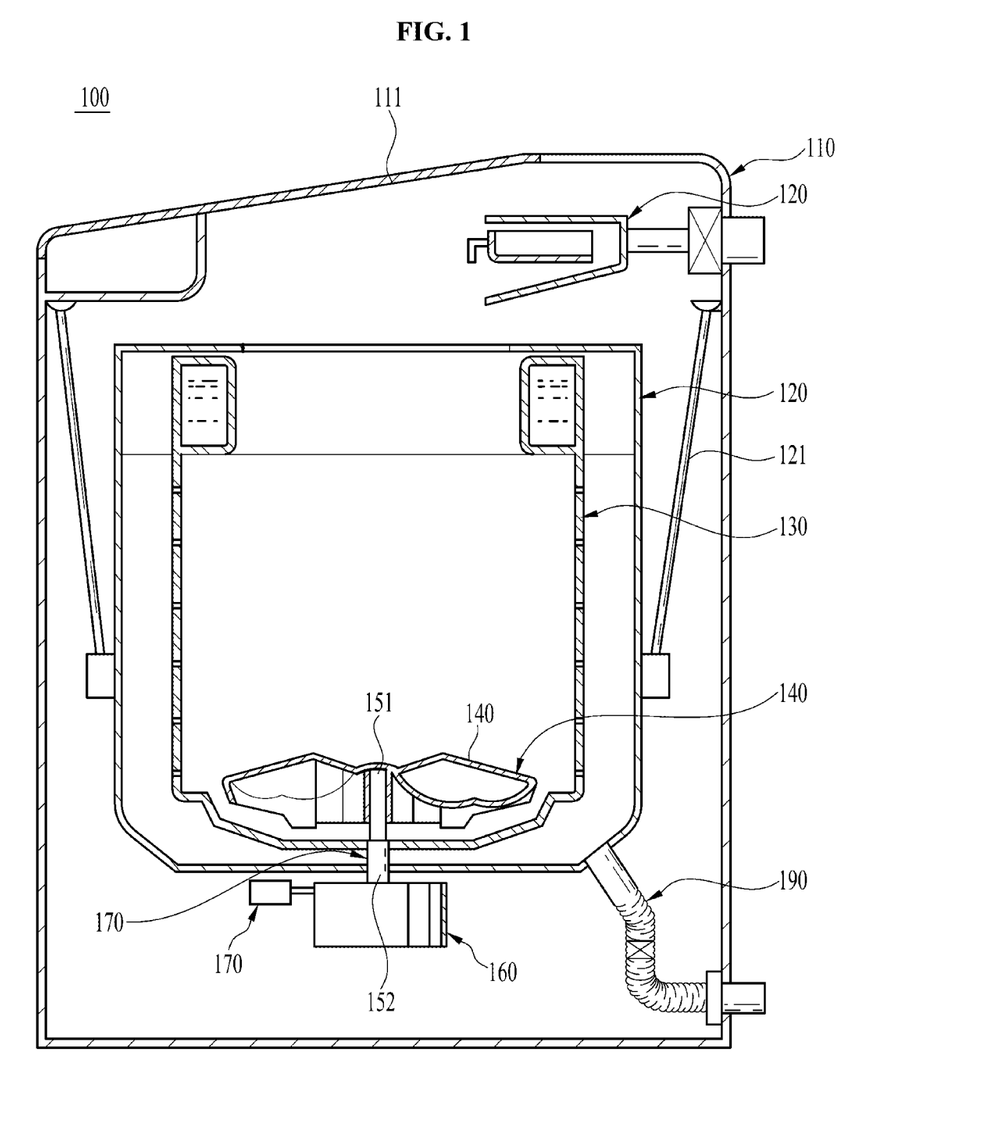
FIG. 1 is a schematic diagram briefly showing a laundry treating apparatus according to the present disclosure.

FIG. 1 is a schematic diagram briefly showing a laundry treating apparatus according to the present disclosure.

As shown in FIG. 1, a laundry treating apparatus 100 according to the present disclosure has a cabinet 110 that forms an outer appearance of the apparatus and has a door 111 at the top, a water storage tub 120 that is disposed inside the cabinet 110, is movable by a separate suspension 121, and stores washing water therein, a rotatable tub 130 that is rotatably disposed inside the water storage tub 120 and receives laundry put thereinto to perform a washing cycle, a rinsing cycle, and a dehydration cycle, a pulsator 140 that is disposed at a lower portion of the rotatable tub 130 to rotate independently of the rotatable tub 130 to form a water flow different from that of the rotatable tub 130, a driving motor 160 that is disposed on a bottom surface of the water storage tub 120 and generates a rotational force to rotate the rotatable tub 130, a power transmitter 150 that selectively transmits the rotational force generated from the driving motor 160 to the rotatable tub 130 and the pulsator 140, a clutch mechanism 200 that is disposed in the power transmitter 150 to selectively control the rotational force transmitted to the rotatable tub 130 and the pulsator 140, a water supply 180 that is disposed above the water storage tub 120 and supplies washing water into the rotatable tub 130, and a drainage 190 that is disposed beneath the water storage tub 120 to drain washing water that has completed the washing, the rinsing, and the dehydration.

In addition, a control panel (not shown) including a manipulation unit for manipulating operation of the laundry treating apparatus 100 and a display for indicating an operating state of the laundry treating apparatus 100 may be formed at one side of the cabinet 110 or the door 111.

In one example, remaining components among the main components of the laundry treating apparatus 100 according to the present disclosure, excluding the power transmitter 150 and the clutch mechanism 200, may be realized using components of a general laundry treating apparatus. Because the present disclosure is related to the power transmitter 150 and the clutch mechanism 200, a detailed description of the components of the general laundry treating apparatus will be omitted.

Figure 2:
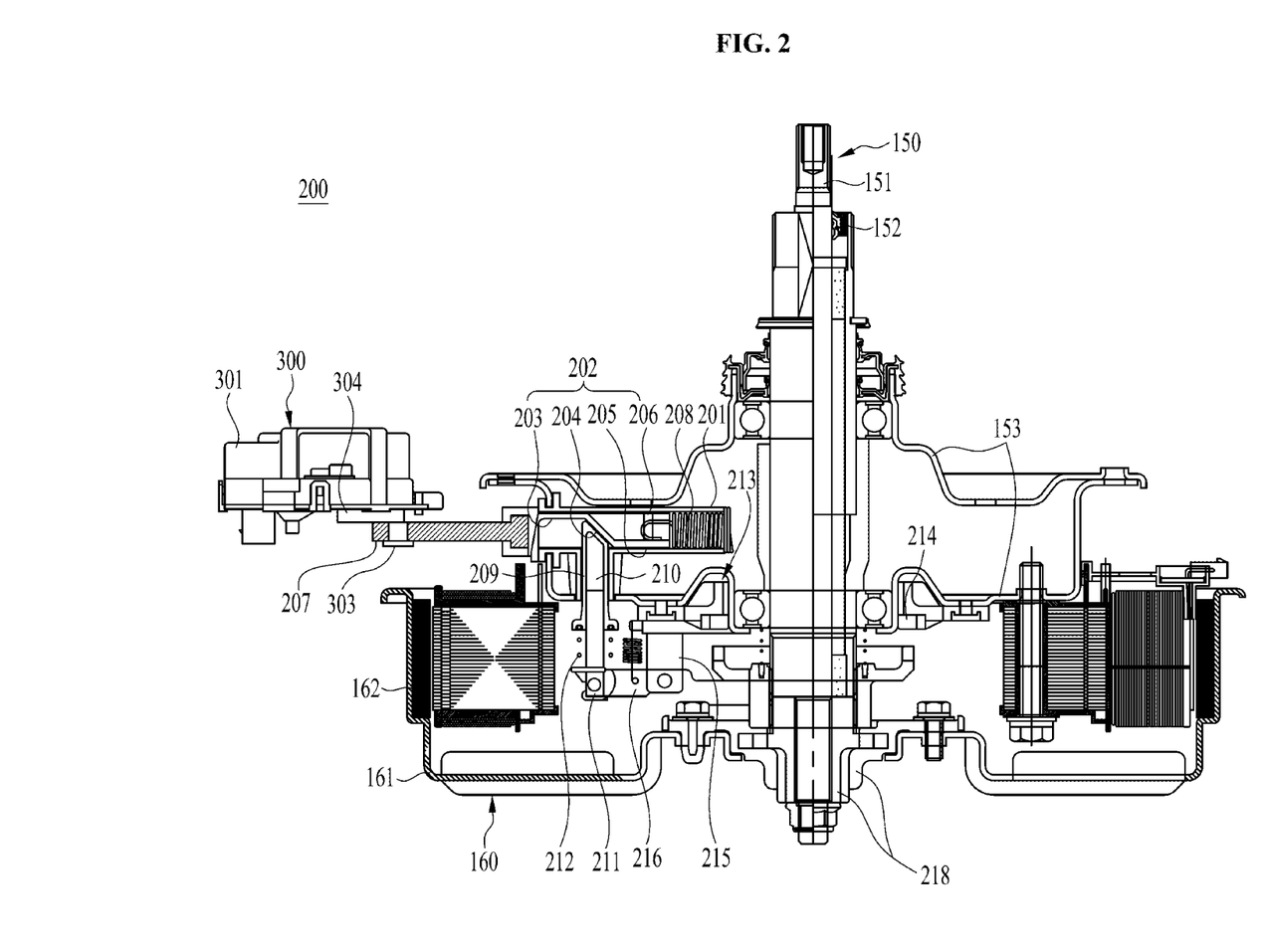
FIGS. 2 and 3 are longitudinal cross-sectional views of a main portion showing operation of a clutch mechanism of a laundry treating apparatus according to the present disclosure.
Figure 3:
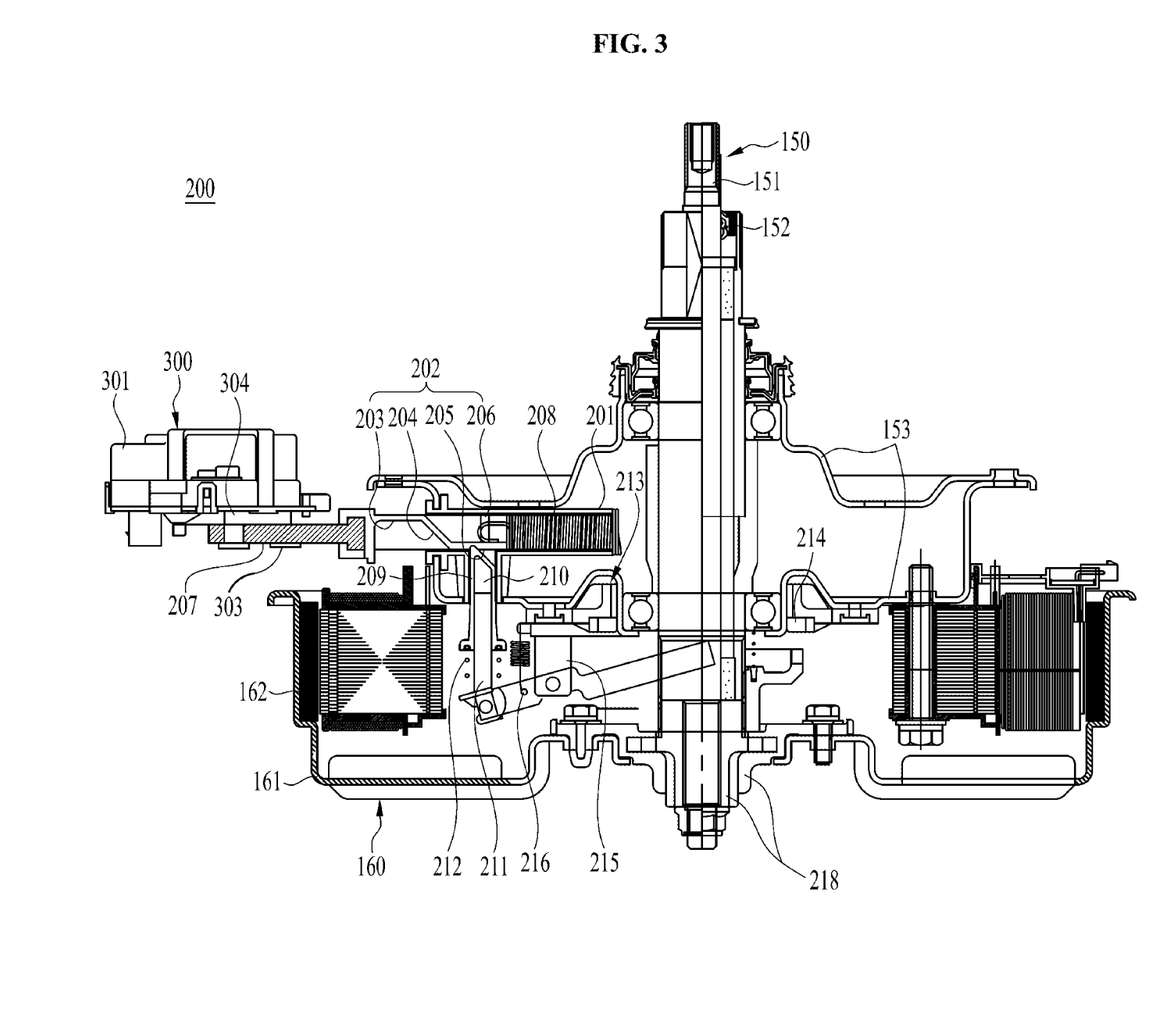

In one example, as shown in FIGS. 2 and 3, the power transmitter 150 includes a bearing housing 153 that rotatably supports a dehydrating shaft 152 fastened to a center of a lower portion of the water storage tub 120 and connected to the rotatable tub 130 and a washing shaft 151 connected to the pulsator 140, the driving motor 160 that is fixed under the bearing housing 153 and generates the rotational force, and the clutch mechanism 200 that selectively switches a power transmission path of the driving motor 160 to the washing shaft 151 or the dehydrating shaft 152 corresponding to the washing cycle or the dehydration cycle.

In this regard, clutch mechanism 200 includes a clutch driver 300 installed beneath the water storage tub 120, a cam 304 coupled to a cam shaft 303 of the clutch driver 300, a lever guide 201 fixed on the bearing housing 153, a level 202 that moves linearly under guidance of the lever guide 201 when the clutch driver 300 is driven, and includes a groove 203 with an inclined surface 204 and a flat surface 205 extending horizontally from a lower end of the inclined surface 204, and a connecting rod 207 that is installed between the cam 304 of the clutch driver 300 and the lever 202 and pulls the lever 202 toward the clutch driver 300 when the clutch driver 300 is turned on.

Additionally, the clutch mechanism 200 includes a return spring 208 with one end fixed to a distal end of the lever guide 201 and the other end fixed to a hooking protrusion 206 at one side of the lever 202 to provide a return force to the lever 202, a hollow cylinder-type movable element 209 that is in contact with the groove 203 having the inclined surface 204 of the lever 202 during the dehydration, and then descends along the inclined surface 204 and is located under the flat surface 205 when switching to a washing mode, a plunger 211 installed to ascend and descend along a guide groove 210 defined inside the movable member 209, a buffer spring 212 located between the movable element 209 and the plunger 211, a coupling stopper 213 that is fixed to a lower portion of the bearing housing 153 and has gear teeth 214 formed along a circumferential direction, a fork-shaped movable rod 216 having one end is hinged to a lower end of the plunger 211 and a middle point hinged to a lower end of a support bracket 215 formed under the coupling stopper 213 to seesaw around the hinged middle point when the plunger 211 ascends and descends, a coupling 217 that switches a rotational power transmission path of the driving motor 160 while ascending and descending along a direction of the dehydrating shaft 152 based on a rotation direction of the movable rod 216, and a connector assembly 218 interposed such that a rotational force of a rotor 161 is transmitted to the washing shaft 151.

In one example, the clutch mechanism 200 as described above may be implemented in various embodiments, and a different type of clutch mechanism 200 other than the clutch mechanism 200 described above may be used.

The clutch mechanism 200 described above has the clutch driver 300 for moving the lever 202 to switch to the washing mode or a dehydration mode.

Figure 4:
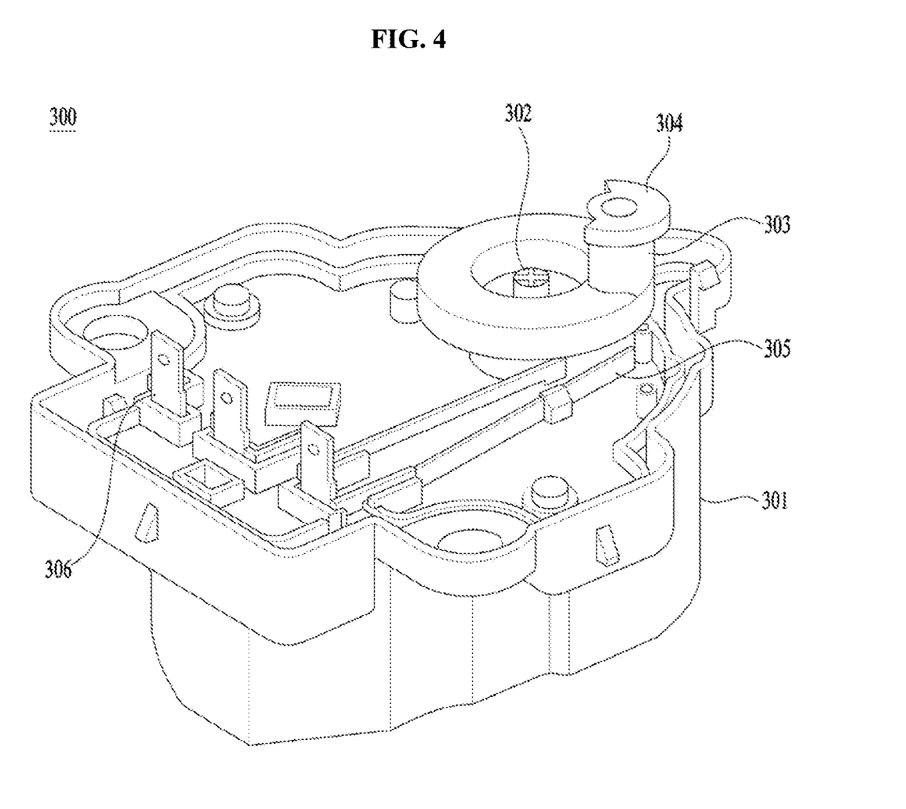
FIG. 4 is a perspective view showing a clutch driver of a laundry treating apparatus according to the present disclosure.

As shown in FIG. 4, the clutch driver 300 may include a clutch motor M having a driving shaft 302, the cam 304 that is fastened to the driving shaft 302 and rotates based on rotation of the driving shaft 302 to linearly move the connecting rod 207, a switch 305 that makes contact and senses the rotation of the driving shaft 302 as the driving shaft 302 rotates, and clutch motor drivers 410 and 420 for driving the clutch motor M.

In this regard, the clutch motor M may be provided as a geared motor that transmits the power to the driving shaft 302 connected to the cam 304 by lowering a speed via a reduction gear disposed therein. Additionally, the clutch motor M may be provided as a brushless DC (BLDC) motor. For example, the clutch motor M may include a surface-mounted permanent-magnet synchronous motor (SMPMSM), an interior permanent magnet synchronous motor (IPMSM), a synchronous reluctance motor (Synrm), and the like. Among those, the SMPMSM and the IPMSM may be selected from permanent magnet synchronous motors (PMSM) and the like.

Hereinafter, the clutch motor drivers 410 and 420 will be described in detail with reference to the attached FIGS. 5 and 6.

Figure 5:
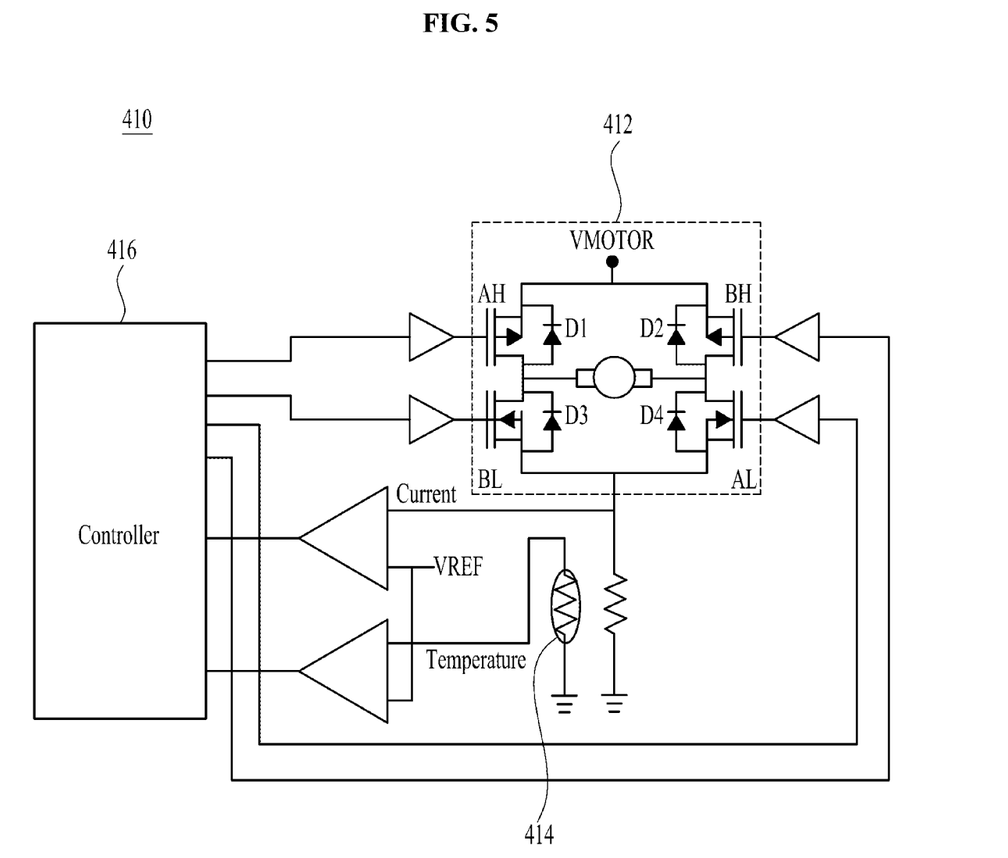
FIGS. 5 and 6 are circuit diagrams showing a clutch motor driver of a laundry treating apparatus according to the present disclosure.
Figure 6:
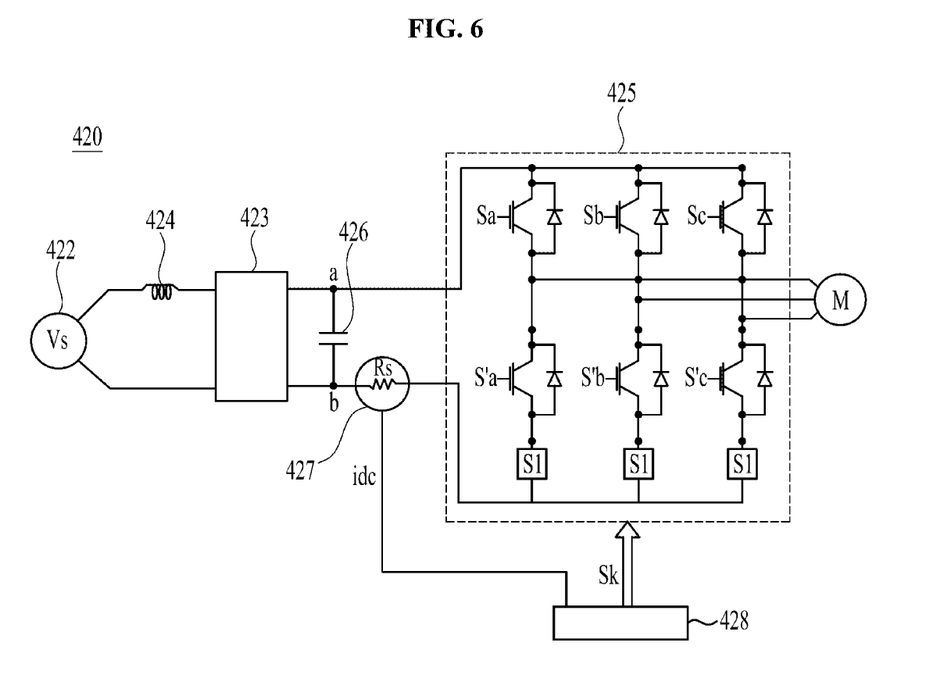

As shown in FIGS. 5 and 6, the clutch motor drivers 410 and 420 are for driving the clutch motor M in a sensorless manner. Such clutch motor drivers 410 and 420 may be implemented in various embodiments. In the present disclosure, the clutch motor drivers 410 and 420 in a case in which the clutch motors M and 302 of the clutch motor drivers 410 and 420 are DC brushed motors or three-phase brushless DC (BLDC) motors will be described.

In this regard, the clutch motor driver 410 shown in FIG. 5 is a control circuit for controlling the DC brushed motor, and the clutch motor driver 420 shown in FIG. 6 is a control circuit for controlling the three-phase BLDC motor.

For reference, the clutch motor drivers 410 and 420 may be substantially the same component as a controller (not shown) that controls the laundry treating apparatus 100, and may correspond to a portion of a circuit constituting the controller.

In addition, in the present disclosure, a description is made with the control circuits for controlling the three-phase BLDC motor and the DC brushed motor as an example, but the present disclosure is not limited thereto. When operating states of the clutch and the clutch driver may be identified using a shunt resistor of the present disclosure, it should be considered to fall into the scope of the present disclosure.

Hereinafter, with reference to FIG. 5, the motor control circuit according to one embodiment of the present disclosure will be described.

As shown in FIG. 5, the clutch motor driver 410 for controlling the DC brushed motor according to one embodiment of the present disclosure includes a motor driving circuit 412 that drives the clutch motor M in response to a control signal, a shunt resistor (R) 414 that is connected in series to a ground output terminal of the driving circuit 412, and a motor sensing controller 416 that detects a current at both ends of the shunt resistor 414 and controls motor driving direction and speed based on a feedback driving voltage of the motor driving circuit 412 and a current detected value of the shunt resistor 414.

In one example, the clutch motor power supply 410 according to one embodiment of the present disclosure described above may receive power via an external power supply and may receive DC or AC power. In this regard, when the AC power is received, a separate converter (not shown) may be additionally disposed.

The motor driving circuit 412 adjusts and controls the driving direction and the driving speed of the clutch motor M as the control signal is input. To this end, the motor driving circuit 412 changes a switching state of each of a plurality of switching elements AH, BL, BH, and AL, converts the control signal into an alternating current signal, and supplies a load to the clutch motor M. In this regard, the clutch motor M may be provided as the DC brushed motor.

In the present embodiment, the motor driving circuit 412 includes the two switching elements AH and BH constituting an upper arm, four free wheeling diodes D1, D2, D3, and D4, and the two switching elements BL and AL constituting a lower arm.

In the motor driving circuit 412, the two switching elements AH and BH constituting the upper arm are connected to a positive DC bus, and the two switching elements BL and AL constituting the lower arm are connected to a ground DC bus.

In this regard, the two switching elements AH and BH constituting the upper arm and the two switching elements BL and AL constituting the lower arm are switching elements using a wide band gap semiconductor, and able to be switching elements made of a silicon carbide (SiC) MOSFET, gallium nitride (GaN), or a semiconductor with a diamond 426 as a main material.

To be more specific, in the present disclosure, it may be proposed that the two switching elements AH and BH constituting the upper arm and the two switching elements BL and AL constituting the lower arm are controlled and driven in a complementary bipolar switching scheme.

The shunt resistor 414 is disposed between the ground DC bus and a node to which the current from the motor M flows. When the current from the motor M flows, a voltage difference occurs between the both ends of the shunt resistor 414, causing a phase current to be generated by a voltage difference at the both ends.

The motor sensing controller 416 may detect the current generated from the shunt resistor 414 based on the sensorless scheme, and determine an operating state of the clutch motor M and a power supply state of the power supply (not shown) based on the feedback driving voltage of the motor driving circuit 412 and the current detected value of the shunt resistor 414.

Figure 7:
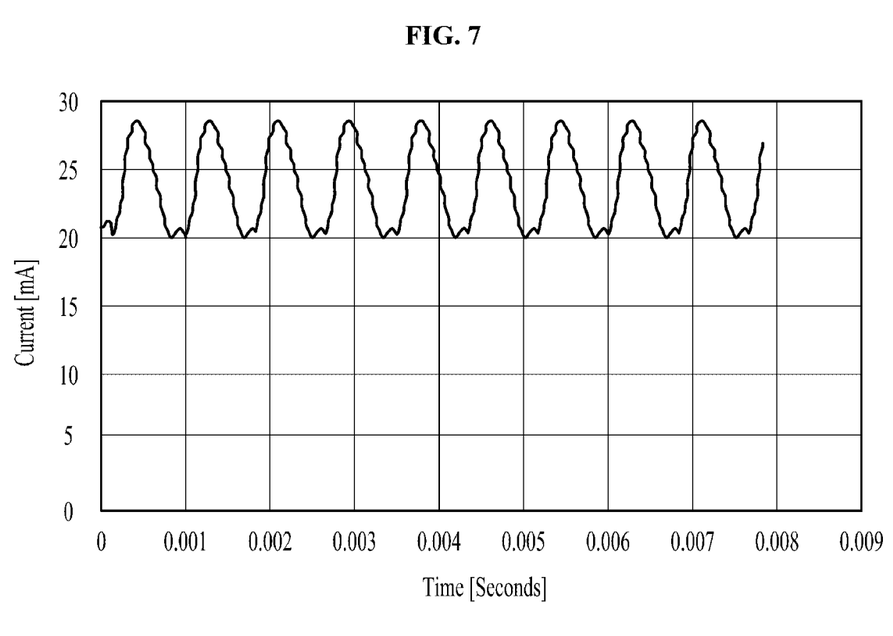
FIG. 7 is a graph showing an example of a current waveform sensed in a clutch motor control circuit of a laundry treating apparatus according to the present disclosure.

Specifically, the motor sensing controller 416 detects the current at the both ends of the shunt resistor 414 and outputs a current value signal indicating a detected value of the phase current based on the voltage difference between the both ends. In this regard, the phase current detected value detected from the shunt resistor may be formed as a graph with a certain pattern when the power is normally input to the clutch motor M and the clutch motor operates normally, as shown in FIG. 7.

In this regard, the motor sensing controller 416 may detect the phase current detected value based on the voltage difference between the both ends of the shunt resistor 414 based on the driving speed along with the driving direction of the clutch motor M (a direction of the motor current) to compensate for detection shortcomings at the ground end, thereby deriving more accurate detection results.

In particular, the motor sensing controller 416 in the present disclosure may detect a phase current value at each peak point of an output waveform counter when a duty ratio of the feedback driving voltage, which is a final output based on control of the clutch motor M, is equal to or greater than a preset reference ratio (e.g., 50%) when detecting the phase current detected value based on the voltage difference between the both ends of the shunt resistor 414.

In addition, when detecting the phase current detected value, when the duty ratio of the feedback driving voltage is smaller than the preset reference ratio (e.g., 50%), a phase current may be detected at each valley point, which is a minimum value of the output waveform counter.

Accordingly, the motor sensing controller 416 in the present disclosure minimizes a timing of detecting the phase current value during a period in which a ringing phenomenon occurs, so that the phase current detected value detected from the shunt resistor 414 allows a minimum current value to be calculated by determining a current direction by a motor voltage scheme. In this regard, the duty ratio may be a ratio of a time during which the current has flowed to a time during which the current has not flowed.

Hereinafter, the clutch motor driver 420 according to another embodiment of the present disclosure will be described with reference to FIG. 6.

As shown, the clutch motor driver 420 for controlling the BLDC motor according to another embodiment of the present disclosure includes a converter 423 that converts AC power supplied from a commercial AC power source 422 into DC power, a reactor 424 disposed between the commercial AC power source 422 and the converter 423, a smoothing capacitor 426 that smoothens the power input via the converter 423 and stores the power, a motor driving circuit 425 that has a plurality of inverter switching elements and converts the smoothened DC power into three-phase AC power of a predetermined frequency by an on/off operation of the switching elements to drive the three-phase BLDC motor M, a shunt resistor 427 connected in series to the converter 423 and the motor driving circuit 425, and a motor sensing controller 428 that detects a current at both ends of the shunt resistor 427 and senses motor driving direction and speed based on a feedback driving voltage of the motor driving circuit 412 and the current detected value of the shunt resistor 427.

In this regard, the reactor 424 is disposed between the commercial AC power source and the converter 423 and performs a power factor correction or voltage boosting operation. Additionally, the reactor L may perform a function of limiting a harmonic current caused by high-speed switching of the converter 423.

In one example, the converter 423 converts the AC power from the commercial AC power source 422 that has passed through the reactor 424 into the DC power and outputs the DC power. In the drawing, the commercial AC power source 422 is shown as a single-phase AC power source, but may also be a three-phase AC power source. Depending on the type of commercial AC power source 422, an internal structure of the converter 423 may also vary.

In addition, the converter 423 may be composed of a diode or the like without a switching element, and may perform a rectification operation without a separate switching operation. For example, in the case of single-phase AC power source, four diodes may be used in a bridge form, and in the case of three-phase AC power source, six diodes may be used in the bridge form.

In one example, for the converter 423, a half-bridge type converter with two switching elements and four diodes connected may be used, and for the three-phase AC power source, six switching elements and six diodes may be used.

Additionally, when the converter 423 includes the switching element, the voltage boosting operation, the power factor improvement, and the DC power conversion may be performed by a switching operation of the corresponding switching element.

In one example, in the drawing, one element is illustrated as the smoothing capacitor 426, but a plurality of elements may be disposed to ensure element stability. In one example, because the DC power is stored, the both ends of the smoothing capacitor 426 may be referred to as DC ends or DC link ends.

In the motor driving circuit 425, each of upper arm switching elements Sa, Sb, and Sc and each of lower arm switching elements S'a, S'b, and S'c that are connected in series with each other may constitute each pair, and a total of three pairs of the upper and lower arm switching elements may be connected in parallel with each other (Sa&S'a, Sb&S'b, and Sc&S'c). In this regard, diodes are connected in an inverse-parallel manner in the switching elements Sa, S'a, Sb, S'b, Sc, and S'c.

In one example, each of the switching elements in the motor driving circuit 420 is turned on/off based on an inverter switching control signal (Sic) from the motor sensing controller 428. As a result, the three-phase AC power with the predetermined frequency is output to the three-phase BLDC motor M.

The shunt resistor 427 is connected in series between the converter 423 and the motor driving circuit 425. When the current from the motor M flows, a voltage difference occurs between both ends of the shunt resistor 414, causing a phase current to be generated by the voltage difference between the both ends.

The motor sensing controller 428 may detect the current generated from the shunt resistor 427 based on the sensorless scheme, and determine an operating state of the clutch motor M and a power supply state of the converter 423 based on the feedback driving voltage of the motor driving circuit 425 and the current detected value of the shunt resistor 423.

Specifically, the motor sensing controller 428 detects the current at the both ends of the shunt resistor 423 and outputs a current value signal indicating a detected value of the phase current based on the voltage difference between the both ends. In this regard, the phase current detected value detected from the shunt resistor may be formed as a graph with a certain pattern when the power is normally input to the clutch motor M and the clutch motor operates normally, as shown in FIG. 7.

In this regard, the motor sensing controller 428 may detect the phase current detected value based on the voltage difference between the both ends of the shunt resistor 423 based on the driving speed along with the driving direction of the three-phase BLDC motor M (a direction of the motor current) to compensate for detection shortcomings at the ground end, thereby deriving more accurate detection results.

In particular, the motor sensing controller 428 in the present disclosure may detect a phase current value at each peak point of an output waveform counter when a duty ratio of the feedback driving voltage, which is a final output based on control of the three-phase BLDC motor M, is equal to or greater than a preset reference ratio (e.g., 50%) when detecting the phase current detected value based on the voltage difference between the both ends of the shunt resistor 423.

In addition, when detecting the phase current detected value, when the duty ratio of the feedback driving voltage is smaller than the preset reference ratio (e.g., 50%), a phase current may be detected at each valley point, which is a minimum value of the output waveform counter.

Accordingly, the motor sensing controller 428 in the present disclosure minimizes a timing of detecting the phase current value during a period in which a ringing phenomenon occurs, so that the phase current detected value detected from the shunt resistor 423 allows a minimum current value to be calculated by determining a current direction by a motor voltage scheme. In this regard, the duty ratio may be a ratio of a time during which the current has flowed to a time during which the current has not flowed.

Hereinafter, a process of sensing, by the clutch driver, the operation of the clutch motor using the shunt resistor in each embodiment of the present disclosure described above will be described in detail with reference to the attached drawings.

In one example, the clutch motor drivers 410 and 420 for driving the DC brushed motor and the three-phase BLDC motor (brushless DC motor) has been used as an example above, but, for convenience of description, the clutch motor driver 410 for driving the DC brushed motor M will be representatively described. However, the embodiment of the present disclosure is not limited thereto. When the operating state of the clutch motor is determined using the shunt resistor and the phase current detected value of the shunt resistor, it should be considered to fall into the scope of the present disclosure.

Figure 8:
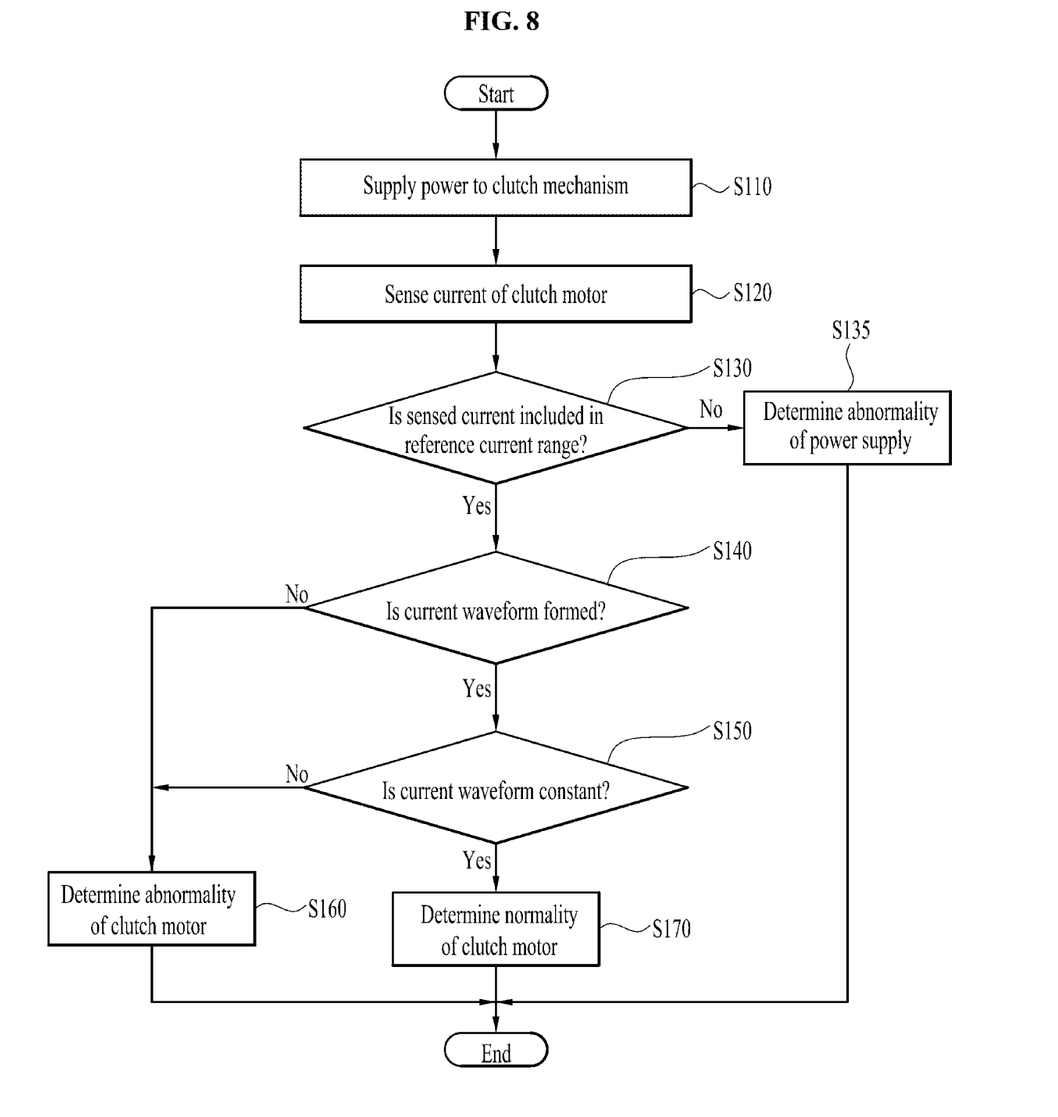
FIG. 8 is a flowchart showing a control process of a laundry treating apparatus according to the present disclosure.

FIG. 8 is a flowchart showing a control process of a laundry treating apparatus according to the present disclosure.

In one example, the present disclosure is to determine the operation of the clutch motor M of the clutch driver 300 that operates the clutch mechanism 200. Therefore, a description of the main cycles (the washing, the rinsing, and the dehydration) of the laundry treating apparatus 100 and a detailed operating process of the clutch mechanism 200 will be omitted.

First, based on the switching of the washing cycle (the washing cycle, the rinsing cycle, or the dehydration cycle) of the laundry treating apparatus 100, the power transmission path of the driving motor 160 may be switched to the washing shaft or/and the dehydrating shaft by the clutch mechanism 200.

In this regard, in the operation of the clutch mechanism 200, the power transmission path may be switched to the washing shaft or/and the dehydrating shaft by the clutch driver 410, and the clutch driver 300 may be controlled by the operation of the clutch motor M. Therefore, the rotation and the speed of the clutch motor M may be controlled by the clutch motor driver 410.

In one example, as the power is applied to the clutch motor driver, the applied power is transmitted to the motor driving circuit 412. In the motor driving circuit, the clutch motor M may be rotated in a forward direction based on switching operation of the first upper switching element AH and the first lower switching element AL, and the clutch motor M may be driven in a reverse direction based on switching operation of the second lower switching element AL and the first upper switching element BH (step S110).

In this regard, the motor sensing controller 416 may sense the voltage difference that occurs between the ground DC bus and the node to which the current from the clutch motor M flows as the clutch motor M is driven via the both ends of the shunt resistor 414 (step S120).

In this regard, the phase current sensed in the shunt resistor 414 forms a waveform of a certain pattern at a current equal to or higher than a certain current as shown in FIG. 7 when the clutch motor M operates normally. A spacing between the patterns may be compared to the rotational speed of the clutch motor M and the peak of the pattern may be compared to a current consumption of the clutch motor M.

In one example, the motor sensing controller 416 senses the waveform pattern sensed by the shunt resistor 414 based on the operation of the clutch motor M, and determines whether the lowest point of the waveform pattern is included in a reference current range (step S130).

In this regard, the lowest point of the waveform pattern sensed by the shunt resistor 414 corresponds to the lowest current value for driving the clutch motor M, and the reference current range corresponds to a minimum current range for normally driving the clutch motor M.

Therefore, when the lowest point of the waveform pattern sensed by the shunt resistor 414 is not included in the reference current range, it may be determined that the normal current is not supplied to the clutch motor M as an abnormality occurs in the power supply (not shown) or the motor driving circuit 412 (step S135).

In this regard, when the motor sensing controller 416 senses that the lowest point of the waveform pattern sensed by the shunt resistor 414 is not included in the reference current range, the abnormal operation of the power supply or the motor driving circuit may be displayed to the user via the display disposed on the control panel of the laundry treating apparatus 100.

In one example, when the lowest point of the waveform pattern sensed by the shunt resistor 414 is included in the reference current range, the motor sensing controller 416 determines whether the waveform pattern of the shunt resistor 414 is formed and sensed (step S140).

In other words, when the lowest point of the waveform pattern sensed by the shunt resistor 414 is included in the reference current range, it means that the power supply or the motor driving circuit 412 operates normally. However, when the waveform pattern sensed by shunt resistor 414 is not formed, it may mean that the clutch motor M itself is malfunctioning.

Accordingly, the motor sensing controller 416 may determine that the clutch motor M itself is defective when the waveform pattern is not formed even though the lowest point of the waveform pattern sensed by the shunt resistor 414 is included in the reference current range (step S160).

In this regard, when sensing that the waveform pattern sensed by the shunt resistor 414 is not formed, the motor sensing controller 416 may display the abnormal operation to the user via the display disposed on the control panel of the laundry treating apparatus 100.

In one example, when the waveform pattern is sensed by the shunt resistor 414, the motor sensing controller 416 determines whether the waveform pattern sensed by the shunt resistor 414 is formed at a regular spacing (step S150).

In this regard, when the waveform pattern sensed by the shunt resistor 414 is formed repeatedly at the regular spacing, it means that the clutch motor M is normally rotated at a constant speed. However, when the waveform pattern sensed by the shunt resistor 414 is formed at an irregular spacing, it means that the clutch motor M is not rotating normally.

In addition, when the waveform pattern sensed by the shunt resistor 414 is formed repeatedly at the regular spacing, but the peaks that protrude at a regular spacing are formed in addition to the repetitive pattern, it may mean that the clutch motor M is rotating normally, but the abnormal operation of the clutch driver 300 or the clutch mechanism 200 is occurred.

Therefore, when the motor sensing controller 416 senses the waveform pattern sensed by the shunt resistor 414 and determines that the clutch driver 300 or the clutch mechanism 200 is defective when the waveform pattern is not formed at the regular spacing (step S160).

In one example, when the waveform pattern sensed by the shunt resistor 414 is formed repeatedly at the regular spacing, the motor sensing controller 416 may identify that the clutch driver 300 and the clutch mechanism 200 are operating normally, and may operate the clutch mechanism to transmit the power of the driving motor to the washing shaft or/and the dehydrating shaft (step S170).

As described above, according to the laundry treating apparatus and the method for controlling the laundry treating apparatus according to the present disclosure, user convenience may be improved because the normal operating states of the clutch mechanism, the clutch driver, and the clutch motor may be determined without adding the separate sensor.

In addition, according to the laundry treating apparatus and the method for controlling the laundry treating apparatus according to the present disclosure, when it is determined that the abnormal operation of the clutch mechanism, the clutch driver, or the clutch motor has occurred, this may be notified to the user, so that the user may be induced to recognize whether the laundry treating apparatus is malfunctioning.

Because the present disclosure may be implemented in other specific forms without changing a technical idea or essential features thereof, those skilled in the art to which the present disclosure belongs should understand that the embodiments described above are illustrative and not restrictive in all aspects. The scope of the present disclosure is indicated by the claims described later rather than the detailed description, and the meaning and the scope of the claims and all changes or modified forms derived from the equivalent concept thereof should be construed as being included in the scope of the present disclosure.

What is claimed is:

1. A laundry treating apparatus comprising:
a water storage tub where washing water is stored;
a rotatable tub rotatably disposed in the water storage tub;
a pulsator rotatably disposed at a lower portion of the rotatable tub;
a washing shaft connected to the pulsator;
a dehydrating shaft connected to the rotatable tub;
a clutch mechanism configured to selectively transmit a rotational force to the washing shaft and the dehydrating shaft; and
a clutch driver configured to operate the clutch mechanism,
wherein the clutch driver includes a clutch motor having a driving shaft, a cam configured to link the clutch mechanism based on rotation of the clutch motor, and a clutch motor driver having a control circuit for driving the clutch motor,
wherein the clutch motor driver includes:
a motor driving circuit configured to drive the clutch motor by adjusting a driving direction and a driving speed of the clutch motor;
a shunt resistor where a phase current is generated by a voltage difference occurring in the motor driving circuit; and
a motor sensing controller configured to detect a current at both ends of the shunt resistor and determine normal operation of the clutch mechanism and the clutch motor based on the current detected value of the shunt resistor.

2. The laundry treating apparatus of claim 1, wherein the motor driving circuit includes two switching elements constituting an upper arm, four free wheeling diodes, and two switching elements constituting a lower arm,
wherein the two switching elements constituting the upper arm are connected to a positive DC bus and the two switching elements constituting the lower arm are connected to a ground DC bus to respectively convert a pulse width control signal and an inverted pulse width control signal into alternating current signals to drive the clutch motor.

3. The laundry treating apparatus of claim 2, wherein the shunt resistor is disposed between the ground DC bus and a node receiving an introduced current from the clutch motor, wherein when the current from the clutch motor flows, a voltage difference occurs between the both ends of the shunt resistor, and the phase current of a waveform with a certain pattern by the voltage difference at the both ends is generated.

4. The laundry treating apparatus of claim 3, wherein the motor sensing controller is configured to determine whether a lowest point of the waveform pattern is included in a reference current range based on the waveform pattern of the phase current sensed by the voltage difference between the both ends of the shunt resistor, and determine that a defect has occurred in the motor driving circuit when the lowest point of the waveform pattern is not included in the reference current range.

5. The laundry treating apparatus of claim 3, wherein the motor sensing controller is configured to determine whether the waveform pattern is formed at a regular spacing based on the waveform pattern of the phase current sensed by the voltage difference between the both ends of the shunt resistor, and determine that a defect has occurred in the clutch motor when the waveform pattern is not repeatedly formed at the regular spacing.

6. The laundry treating apparatus of claim 3, wherein the motor sensing controller is configured to determine whether peaks of the waveform pattern are formed at a regular spacing based on the waveform pattern of the phase current sensed by the voltage difference between the both ends of the shunt resistor, and determine that a defect has occurred in the clutch driver or the clutch mechanism when the peaks of the waveform pattern are not formed repeatedly at the regular spacing.

7. The laundry treating apparatus of claim 1, wherein the clutch motor driver further includes a converter configured to convert AC power supplied from a commercial AC power source into DC power, a reactor disposed between the commercial AC power source and the converter, and a smoothing capacitor configured to smoothen the power input via the converter and store the smoothened power.

8. The laundry treating apparatus of claim 7, wherein the motor driving circuit includes three pairs connected in series with each other, wherein each pair has an upper arm switching element and a lower arm switching element connected in parallel with each other, and diodes connected to each other in an inverse-parallel manner respectively in each upper arm switching element and each lower arm switching element,
wherein the motor driving circuit converts the smoothened DC power into three-phase AC power of a predetermined frequency by on/off operations of each switching element to drive the clutch motor.

9. The laundry treating apparatus of claim 8, wherein the shunt resistor is disposed between the converter and a node receiving an introduced current from the clutch motor, wherein when the current from the clutch motor flows, a voltage difference occurs between the both ends of the shunt resistor, and the phase current of a waveform with a certain pattern by the voltage difference at the both ends is generated.

10. The laundry treating apparatus of claim 9, wherein the motor sensing controller is configured to determine whether a lowest point of the waveform pattern is included in a reference current range based on the waveform pattern of the phase current sensed by the voltage difference between the both ends of the shunt resistor, and determine that a defect has occurred in the motor driving circuit when the lowest point of the waveform pattern is not included in the reference current range.

11. The laundry treating apparatus of claim 9, wherein the motor sensing controller is configured to determine whether the waveform pattern is formed at a regular spacing based on the waveform pattern of the phase current sensed by the voltage difference between the both ends of the shunt resistor, and determine that a defect has occurred in the clutch motor when the waveform pattern is not repeatedly formed at the regular spacing.

12. The laundry treating apparatus of claim 9, wherein the motor sensing controller is configured to determine whether peaks of the waveform pattern are formed at a regular spacing based on the waveform pattern of the phase current sensed by the voltage difference between the both ends of the shunt resistor, and determine that a defect has occurred in the clutch driver or the clutch mechanism when the peaks of the waveform pattern are not formed repeatedly at the regular spacing.

13. A method for controlling a laundry treating apparatus including a water storage tub where washing water is stored, a rotatable tub rotatably disposed in the water storage tub, a pulsator rotatably disposed at a lower portion of the rotatable tub, a washing shaft connected to the pulsator, a dehydrating shaft connected to the rotatable tub, a clutch mechanism configured to selectively transmit a rotational force to the washing shaft and the dehydrating shaft, a clutch motor configured to link the clutch mechanism, and a clutch motor driver having a control circuit to drive the clutch motor, wherein the clutch motor driver includes a motor driving circuit configured to drive the clutch motor by adjusting a driving direction and a driving speed of the clutch motor, and a shunt resistor where a phase current is generated by a voltage difference occurring in the motor driving circuit, the method comprising:

- a power supply of applying power to the motor driving circuit to drive the clutch motor;
- a detection of detecting a waveform of the phase current generated at both ends of the shunt resistor connected in series to an output terminal of the motor driving circuit; and
- a determination of determining operation of the clutch mechanism and the clutch motor based on a current waveform pattern of the phase current generated in the shunt resistor.

14. The method of claim 13, wherein the detection includes detecting the waveform of the phase current generated in the shunt resistor, and the determination includes determining that a defect has occurred in a power supply configured to supply the power when the waveform pattern is not detected.

15. The method of claim 13, wherein the detection includes detecting a lowest point of the waveform pattern of the phase current generated in the shunt resistor, and the determination includes determining that a defect has occurred in the motor driving circuit when the lowest point of the detected waveform pattern is not included in a reference current range.

16. The method of claim 13, wherein the detection includes detecting a spacing of the waveform pattern of the phase current generated in the shunt resistor, and the determination includes determining that a defect has occurred in the clutch motor when the detected waveform pattern is not formed repeatedly at a regular spacing.

17. The method of claim 13, wherein the detection includes detecting peaks and a spacing between the peaks of the waveform pattern of the phase current generated in the shunt resistor, and the determination includes determining that a defect has occurred in the clutch driver or the clutch mechanism when the peaks of the waveform pattern are not formed repeatedly at a regular spacing.

* * * * *